(12) United States Patent
Corriveau et al.

(10) Patent No.: US 9,807,362 B2
(45) Date of Patent: Oct. 31, 2017

(54) INTELLIGENT DEPTH CONTROL

(75) Inventors: Philip J. Corriveau, Carlton, OR (US); Rina A. Doherty, Forest Grove, OR (US); Audrey C. Younkin, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 447 days.

(21) Appl. No.: 13/435,444

(22) Filed: Mar. 30, 2012

(65) Prior Publication Data

US 2013/0258070 A1 Oct. 3, 2013

(51) Int. Cl.
*H04N 13/00* (2006.01)
*H04N 13/04* (2006.01)
*H04N 5/85* (2006.01)

(52) U.S. Cl.
CPC ..... *H04N 13/0022* (2013.01); *H04N 13/0402* (2013.01); *H04N 13/0475* (2013.01); *H04N 13/0404* (2013.01); *H04N 13/0409* (2013.01)

(58) Field of Classification Search
USPC .......................................... 348/51
See application file for complete search history.

(56) References Cited

U.S. PATENT DOCUMENTS

| | | | |
|---|---|---|---|
| 2010/0080202 A1* | 4/2010 | Hanson | H04L 63/0853 370/338 |
| 2010/0103249 A1 | 4/2010 | Lipton et al. | |
| 2011/0316848 A1* | 12/2011 | Newton | H04N 5/85 345/419 |
| 2011/0316987 A1* | 12/2011 | Komoriya | G06K 9/00228 348/51 |

(Continued)

FOREIGN PATENT DOCUMENTS

| | | |
|---|---|---|
| KR | 10-0560464 B1 | 3/2006 |
| KR | 10-0976141 B1 | 8/2010 |

(Continued)

OTHER PUBLICATIONS

International Search Report and Written Opinion received for PCT Patent Application No. PCT/US2013/034296, mailed Jul. 29, 2013, 10 Pages.

(Continued)

*Primary Examiner* — Obafemi Sosanya
(74) *Attorney, Agent, or Firm* — Grossman, Tucker, Perreault & Pfleger, PLLC (57) ABSTRACT

A system configured to display autostereoscopic video (AV) may determine a depth setting for displaying the AV based on at least one of user parameters or device parameters, and may proceed to display the AV on a display based on the depth setting. In one embodiment the system may try to obtain user parameters before relying on device parameters. User parameters may be available from user profiles. For example, facial recognition may be used to determine if a user profile exists for a user. If a user profile is determined not to exist for the user, then the system may sense a distance from the display to the viewer, and may proceed to determine the depth setting based on the distance and device characteristics. Device characteristics may identify the manufacturer/model of the system, the type/size of display on which the AV will be viewed, the abilities of the system, etc.

15 Claims, 6 Drawing Sheets

(56) References Cited

U.S. PATENT DOCUMENTS

| | | | | |
|---|---|---|---|---|
| 2012/0013604 A1* | 1/2012 | Kang | ................. | H04N 13/0022 |
| | | | | 345/419 |
| 2012/0257795 A1* | 10/2012 | Kim | ................... | H04N 13/0022 |
| | | | | 382/106 |
| 2013/0127823 A1* | 5/2013 | Diverdi | ................... | G06T 17/10 |
| | | | | 345/419 |
| 2013/0152152 A1* | 6/2013 | Benyola | ........................ | 725/153 |

FOREIGN PATENT DOCUMENTS

| | | |
|---|---|---|
| KR | 10-2012-0015666 A | 2/2012 |
| WO | 2008132724 A1 | 11/2008 |

OTHER PUBLICATIONS

International Preliminary Report on Patentability and Written Opinion received for PCT Application No. PCT/US2013/034296 mailed on Oct. 9, 2014.

European Search Report received for European Application No. 13767637.5, mailed Oct. 26, 2015, 6 pages.

\* cited by examiner

INTELLIGENT DEPTH CONTROL

FIELD

The following disclosure relates to displaying autostereoscopic video (AV) information, and more particularly, to devices able to display AV information with configurable depth.

BACKGROUND

Autostereoscopy includes various methods of displaying stereoscopic images that add binocular perception of three-dimensional (3-D) depth without use of special headgear, glasses, etc. on the part of the viewer. Autostereoscopic video (AV), such as 3-D movies, games, etc., may be generated using equipment (e.g., cameras and other video processing equipment) that is configured to generate 3-D imagery based specifically on where the AV will be displayed. For example, autostereoscopic movies may be generated for display in a movie theatre, and thus, may include 3-D effects configured to appear correctly in a large display format. Similarly, mobile devices (e.g., cellular handsets including smartphones, tablet-based computers, etc.) may comprise autostereoscopic cameras configured to capture 3-D video. While such functionality may be desirable, the 3-D video captured by the camera may be configured for display only on the small screen of the capturing device. This limitation becomes more problematic as a larger variety of devices capable of displaying 3-D video start to become available. For example, AV generated for display in a large format (e.g., on a movie screen, television, etc.) may not display correctly on the screen of a mobile device due to the small size of the display, the position of the viewer (e.g., mobile device user) with respect to the display of the mobile device, etc. The small display size/viewer position may cause the AV to appear "flat" on the mobile device (e.g., no 3-D depth perceived by the viewer), and thus, the AV may not invoke the experience of immersion originally intended by the AV creator. Similarly, a stereoscopic camera in a mobile device may be configured to capture AV for viewing on a display internal to the mobile device. As a result, AV generated by a mobile device may not display correctly on larger displays (e.g., computer monitors, televisions, etc.) due to, for example, too much 3-D depth in the AV. Too much 3-D depth may also distort the immersion experience from the original intent, and could even cause the viewer to experience discomfort (e.g., visual fatigue that may cause headaches, dizziness, nausea, etc.).

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Generally, this disclosure describes systems and methods for intelligent depth control for displaying autostereoscopic images and video (referred to generally herein as autostereoscopic video or "AV"). As referenced herein, AV may comprise any three-dimensional (3-D) display technology that allows a viewer to perceive 3-D depth without the use of glasses, headgear, etc. In one embodiment, a system may be configured to determine a depth setting for displaying AV based on at least one of user parameters or device parameters, and may then proceed to display the AV based on the depth setting. Example systems may include devices, or groups of devices, that include a display capable of displaying AV such as mobile communication devices, portable computers, desktop computers, monitors, televisions, home entertainment systems, video conferencing systems, etc. In one embodiment, user parameters may include depth preferences (e.g., minimum and maximum allowed depth settings) configured by a particular user, and may be stored in a profile corresponding to the particular user, while device parameters may include the distance the system's display device is from an AV viewer and various device characteristics.

In one embodiment, the system may attempt to employ user parameters in determining the depth setting prior to using device parameters. For example, the device parameters may only be used if a user cannot be identified (e.g., if a profile cannot be located corresponding to a user). In one embodiment, users may be identified using facial recognition. An image capture device (e.g., a camera) may capture an image, and a face may be detected in the image. The system may then proceed to extract features from the detected face, and may try to determine whether a profile exists corresponding to the user based on the extracted facial features. If a user profile corresponding to the user is determined to exist, the system may determine user parameters using information (e.g., depth preferences) in the user profile, and may display the AV using a depth setting based on the user parameters. The depth setting may be, for example, an image disparity setting for controlling the disparity between left eye and right eye AV images when displaying the AV, which may affect depth perception for each viewing angle of the system's display.

In the same or a different embodiment, if, after attempting to determine whether a user profile exists for a user (e.g., based on facial recognition) it is determined that no user profile exists for the user, the system may then utilize device parameters for setting the depth. Initially, the system may determine the distance between the display and at least one viewer that will view the AV. For example, a proximity sensor may be configured to sense the distance from the display to a viewer. Device characteristics may also be determined, such as a manufacturer of the system, a model identifier for the system, etc. The manufacturer/model information may be utilized to determine, either locally or remotely (e.g., via the Internet), device characteristics for the system. In some instances (e.g., where previously determined device characteristics are not available based on the system's manufacturer/model), it may also be possible to determine device characteristics based on the capabilities of the system. For example, information like the type of display that will be used to display the AV, the size of the display that will be used to display the AV, the video processing chipset being used in the system, etc., may be employed in determining the device characteristics. The distance from the display to the viewer and/or the device characteristics may then be used in determining a depth setting for displaying the AV.

Figure 1:
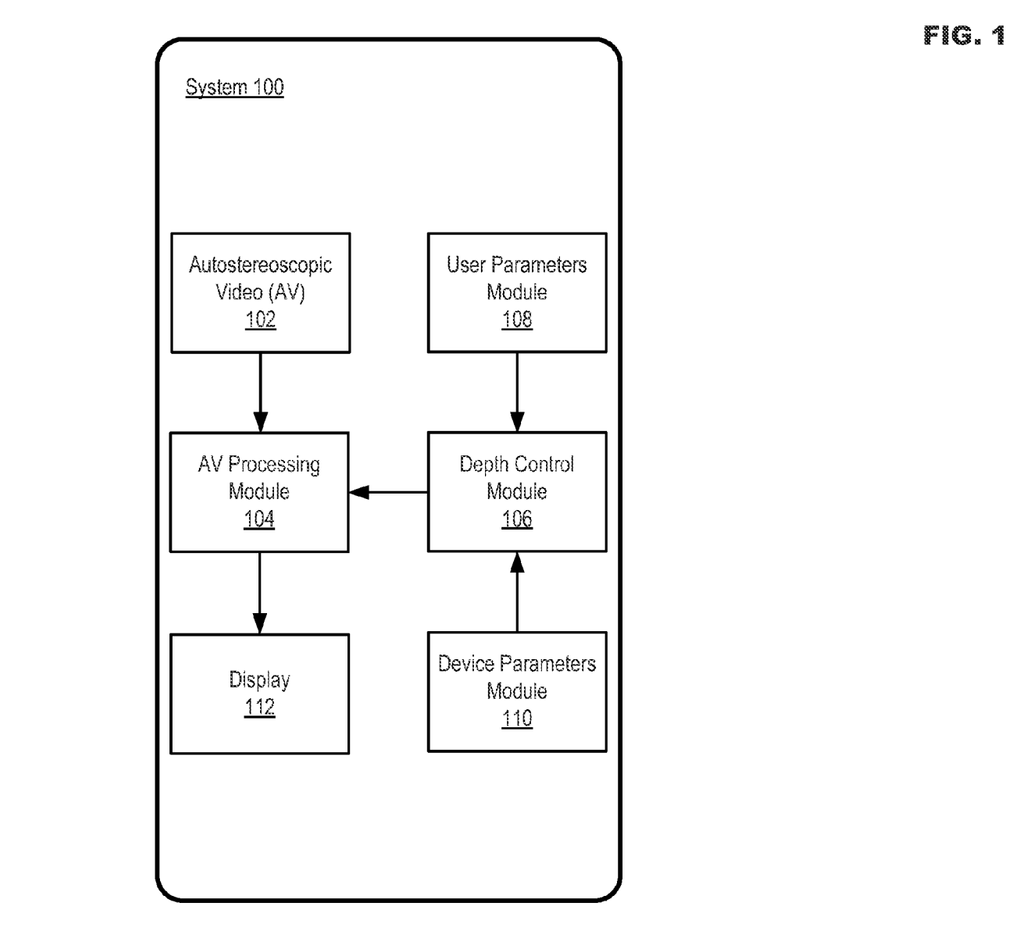
FIG. 1 illustrates an example system configured for displaying AV with intelligent depth control in accordance with at least one embodiment of the present disclosure.

FIG. 1 illustrates example system 100 configured for displaying AV with intelligent depth control in accordance with at least one embodiment of the present disclosure. System 100 may be a device, or group of devices, capable of displaying AV. Examples of system 100 may include a mobile communication device such as cellular handset or a smartphone based on the Android® operating system (OS), iOS®, Blackberry® OS, Palm® OS, Symbian® OS, etc., a mobile computing device such as a tablet computer like an Ipad®, Galaxy Tab®, Kindle Fire®, etc., an Ultrabook® including a low-power chipset manufactured by Intel Corp., a netbook, a notebook computer, a laptop computer, etc. Examples of system 100 may also include typically stationary devices capable of displaying AV such as a desktop computer with an integrated or separate display, a standalone monitor (e.g., television) and/or systems that may comprise a standalone monitor such as a home entertainment system, a videoconferencing system, etc.

Initially, system 100 includes AV 102. For example, system 100 may display AV 102 directly from a fixed medium (e.g., CD, DVD, memory stick or another read-only or rewritable medium) inserted in, or coupled to, system 100, may store AV 102 within system 100 for later presentation, may receive a transmission including AV 102 via wired or wireless communication and may then immediately display AV 102 (e.g., "streaming"), etc. System 100 also includes modules 104-110, which may be configured to interact to cause AV 102 to be displayed on display 112. AV processing module 104 may be configured to process AV 102 in preparation for showing on display 112. In one embodiment, processing may include employing a depth setting for use in displaying AV 102. For example, the depth setting may be an image disparity setting. In particular, AV may include two images: one for viewing by the left eye of a viewer and one for viewing by the right eye of the viewer. Display 112 may be configured to separate the left and right images so that they are only viewed by the left eye and right eye, respectively. Example display technologies that allow display 112 to separate the left and right images include parallax barrier and lenticular array. Parallax barrier displays may interpose many small opaque barriers that block the images so that they are only viewed by the intended eye, while lenticular array displays employ many small lenses integrated into the surface of the display to focus the images so that they are only viewed by the intended eye. By changing the separation (e.g., the disparity) between the left and right images, the amount of depth perceived by a viewer may be increased, diminished or even reversed, and thus, the amount of 3-D immersion into AV 102 may be controlled. In this manner, the displaying of AV 102 may be configured so that the originally intended 3-D effect may manifest on display 112, regardless of the size, type, etc. of display 112.

The depth setting employed by AV processing module 104 may be determined by depth control module 106. In particular, depth control module 106 may receive user parameters from user parameter module 108 and/or device parameters from device parameters module 110, and may utilize these parameters in making a determination. For example, user parameters may be derived from a user profile corresponding to a user viewing AV 102, and may include, for example, a minimum and/or maximum amount of depth "effect" for allowed for displaying AV 102. A user may specify the amount of depth effect to help create the type of experience desired when viewing AV 102. Alternatively, a user may be sensitive to too much depth effect, and thus may specify a maximum amount of depth affect in order to avoid experiencing discomfort when viewing AV 102. Device parameters may be related to system 100 and/or the position of system 100 with respect to a viewer of AV 102. For example, device parameters module 110 may determine a distance from display 112 to the viewer, and may utilize this information along with device characteristics in determining device parameters. Device characteristics may include information about the manufacturer/model of system 100 and/or display 112, or may be based on characteristics derived from system 100 such as a size, type, etc. for display 112, a type of video processing chipset being used in system 100, etc.

Figure 2:
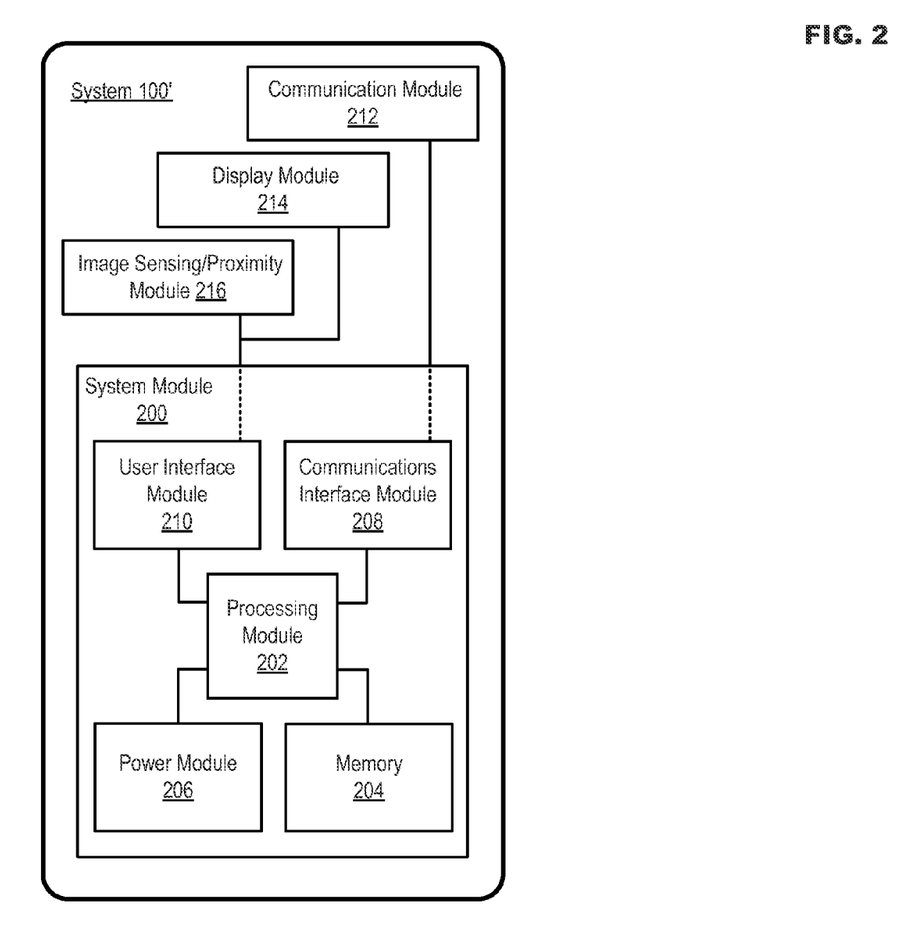
FIG. 2 illustrates example modules that may be employed in implementing a system such as disclosed in FIG. 1.

FIG. 2 illustrates an example system 100' in accordance with various embodiments of the present disclosure. System 100' may include modules configured to implement at least modules 104-110 as illustrated in FIG. 1. System module 200 may be configured to perform the various functions that may occur during normal operation. For example, processing module 202 may comprise one or more processors situated in separate components, or alternatively, may comprise one or more processing cores situated in a single component (e.g., in a System-on-a-Chip (SOC) configuration). Example processors may include various X86-based microprocessors available from the Intel Corporation including those in the Pentium, Xeon, Itanium, Celeron, Atom, Core i-series product families. Processing module 202 may be configured to execute instructions in System 100'. Instructions may include program code configured to cause processing module 202 to perform activities related to reading data, writing data, processing data, formulating data, converting data, transforming data, etc. Instructions, data, etc. may be stored in memory 204. Memory 204 may comprise random access memory (RAM) or read-only memory (ROM) in a fixed or removable format. RAM may include memory configured to hold information during the operation of System 100' such as, for example, static RAM (SRAM) or Dynamic RAM (DRAM). ROM may include memories such as bios memory configured to provide instructions when system 100' activates, programmable memories such as electronic programmable ROMs, (EPROMS), Flash, etc. Other fixed and/or removable memory may include magnetic memories such as floppy disks, hard drives, etc., electronic memories such as solid state flash memory (e.g., eMMC, etc.), removable memory cards or sticks (e.g., uSD, USB, etc.), optical memories such as compact disc-based ROM (CD-ROM), etc. Power Module 206 may include internal (e.g., battery) and/or external (e.g., wall plug) power sources and circuitry configured to supply system 100' with the power needed to operate. Communications interface module 208 may be configured to handle packet routing and various control functions for communication module 212, which may include various resources for conducting wired and/or wireless communications. Wired communications may include mediums such as, for example, Universal Serial Bus (USB), Ethernet, etc. Wireless communications may include, for example, close-proximity wireless mediums (e.g., radio frequency (RF), infrared (IR), etc.), short-range wireless mediums (e.g., Bluetooth, wireless local area networking (WLAN), etc.) and long range wireless mediums (e.g., cellular, satellite, etc.). For example, communications interface module 208 may be configured to prevent wireless communications active in communication module 212 from interfering with each other. In performing this function, communications interface module 208 may schedule activities for communication module 212 based on the relative priority of the pending messages.

User interface module 210 may include circuitry configured to allow a user to interact with system 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, indicators, electromechanical components for vibration, motion, etc.). In one embodiment, user interface module 210 may include, or may be coupled to, display module 214 and image sensing/proximity module 216. Display module 214 may include an integrated or separate display (e.g., computer monitor, television, etc.) configured to display AV using, for example, one of the previously disclosed 3-D display technologies or another similar technology. Image sensing/proximity module 216 may include an image capture device such as, for example, a still-frame or video camera integrated in, or coupled to, system 100'. Image sensing/proximity module 216 may be configured to capture images (e.g., to capture images for identifying possible users of system 100') and/or to determine the distance from system 100' to a viewer of display module 214. In one embodiment, image sensing/proximity module 216 may include, or be coupled to, a proximity sensor that is separate from the image capture device, the proximity sensor being configured to determine the distance to a viewer of display module 214.

Figure 3:
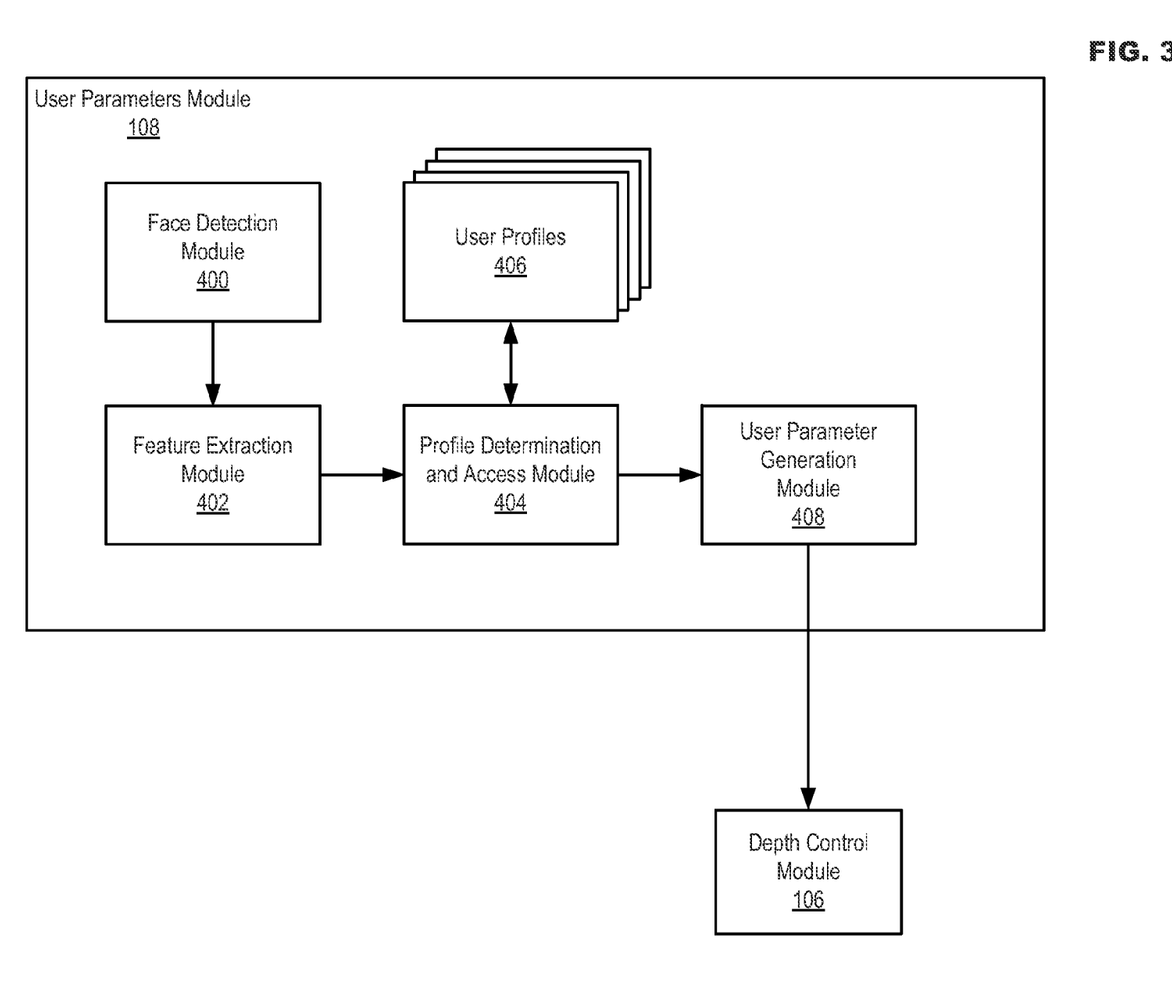
FIG. 3 illustrates an example user parameters module in accordance with at least one embodiment of the present disclosure.

FIG. 3 illustrates example user parameters module 108 in accordance with at least one embodiment of the present disclosure. In general, user parameters module 108 may determine if a user profile exists for a user, and if the user profile is determined to exist, user parameters module 108 may further generate user parameters based on information in the user profile. While manual entry of a user's identity into system 100 and/or the selection of a user profile are possible, in one embodiment, the determination of whether a profile corresponds to the user may be based on facial recognition. In this regard, face detection module 400 may be configured to identify a face and/or facial region in image(s) provided by image sensing/proximity module 216. For example, face detection module 400 may include custom, proprietary, known and/or after-developed face recognition code (or instruction sets), hardware, and/or firmware that are generally well-defined and operable to receive an image (e.g., but not limited to, a RGB color image) and to identify, at least to a certain extent, a face in the image. Face detection module 400 may also be configured to track the face through a series of images (e.g., video frames at 24 frames per second). Detection systems usable by face detection module 400 include particle filtering, mean shift, Kalman filtering, etc., each of which may utilize edge analysis, sum-of-square-difference analysis, feature point analysis, histogram analysis, skin tone analysis, etc.

Feature extraction module 402 may be configured to define features in the face detected by face detection module 400, the features being usable for identification (e.g., for determining whether a profile exists corresponding to the user). Feature extraction module 402 may include custom, proprietary, known and/or after-developed facial characteristics recognition code (or instruction sets) that is generally well-defined and operable to receive an image captured by, for example, image sensing/proximity module 216, wherein a face has previously been detected by face detection module 400, and to identify or "extract", at least to a certain extent, one or more facial features in the face. Facial characteristics systems usable by feature extraction module 402 may include, but are not limited to, the CSU Face Identification Evaluation System by Colorado State University.

Profile determination and access module 404 may include custom, proprietary, known and/or after-developed facial identification code (or instruction sets) that is generally well-defined and operable to compare the facial features extracted by feature extraction module 402 to stored patterns of extracted facial features (hereafter, "feature patterns"). For example, profile determination and access module 404 may be configured to compare the extracted facial features to feature patterns stored in user profiles database 406, and if a matching user profile is determined to exist, profile determination and access module 404 may access information in the user profile for determining user parameters. User profiles database 406 may comprise accounts or records including at least feature patterns and AV depth preferences. User profiles database 406 may reside locally in system 100 or remotely (e.g., accessible via the Internet), and may be proprietary to, for example, an AV viewing or distribution system, or may be associated with an existing online interactive system (e.g., Facebook, MySpace, Google+, LinkedIn, Yahoo, etc.). Profile determination and access module 404 may compare extracted features to feature patterns utilizing geometric analysis (which looks at distinguishing features) and/or photometric analysis (which is a statistical approach that distills an image into values and compares the values with templates to eliminate variances). Some face recognition techniques include, but are not limited to, Principal Component Analysis with eigenfaces (and derivatives thereof), Linear Discriminate Analysis with fisherface (and derivatives thereof), Elastic Bunch Graph Matching (and derivatives thereof), the Hidden Markov model (and derivatives thereof), and the neuronal motivated dynamic link matching. If a matching user profile is determined to exist, information may be accessed in the user profile (e.g., depth preference information) for use by user parameter generation module 408. For example, user parameter generation module 408 may utilize depth preference information obtained from a user profile to generate maximum and minimum allowed depth effect parameters for use in displaying AV 102. The user parameters generated by user parameter generation module 408 may then be provided to depth control module 106.

Figure 4:
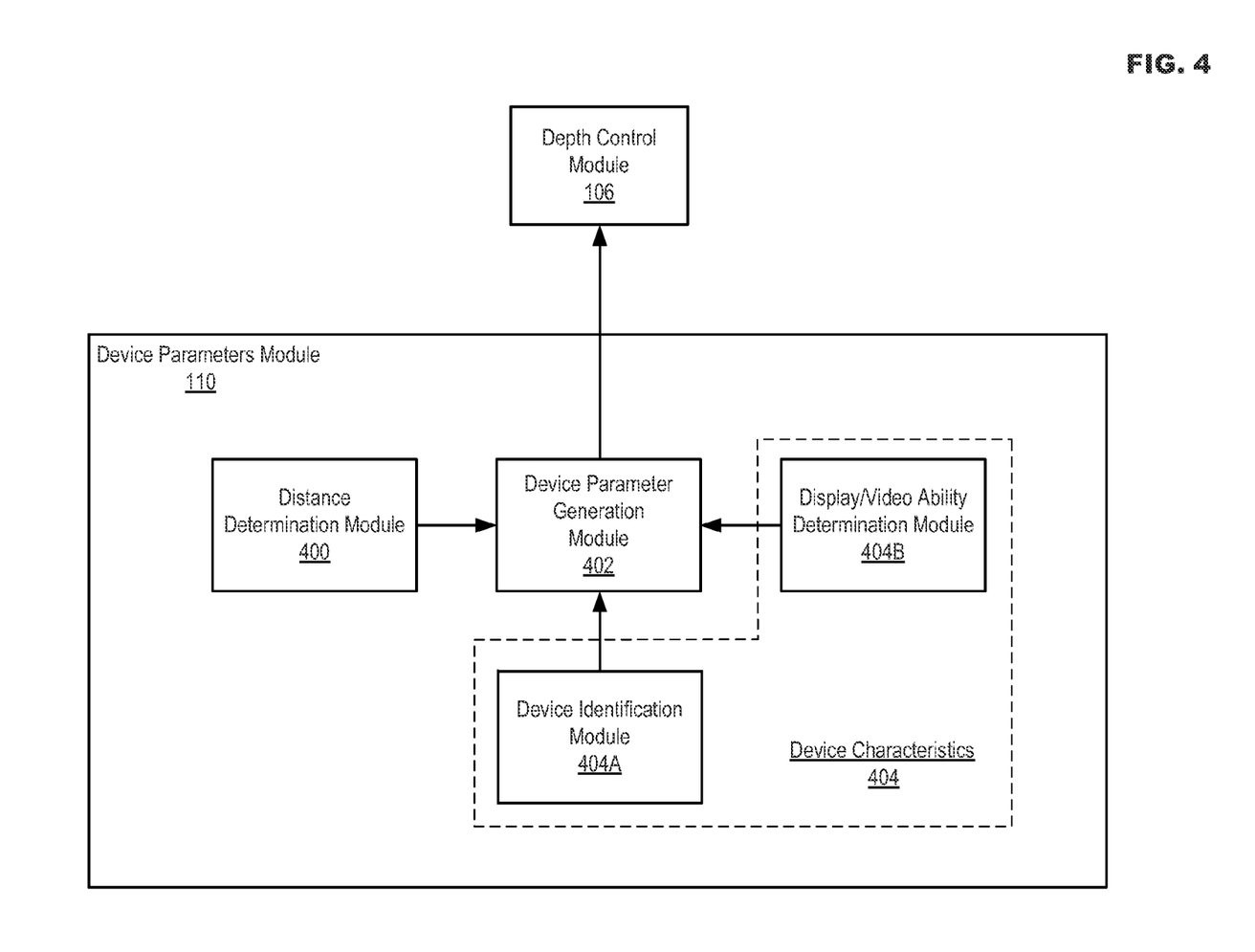
FIG. 4 illustrates an example device parameters module in accordance with at least one embodiment of the present disclosure.

It may be possible that no user profile is determined to exist corresponding to a particular user, system 100 does not have resources available to support user parameter determination such as illustrated in FIG. 3, etc. In one embodiment, device parameters may be used in place of user parameters for intelligent depth control. FIG. 4 illustrates example device parameters module 110 in accordance with at least one embodiment of the present disclosure. In general, device parameters module 110 may determine a distance from display 112 in system 100 to a viewer, and may utilize this distance along with device characteristics in determining device parameters. In example system 100', distance determination module 400 may use image sensing/proximity module 216 in determining a distance from display module 214 to a viewer. Distance may be determined via, for example, an optical proximity sensor (e.g., image-based, laser, infrared, etc.) activated prior to displaying AV 102, possibly in conjunction with a message that is displayed instructing the viewer to sit in a position relative to system 100 where AV 102 will be viewed, to place system 100 in a position for viewing AV 102, etc. Distance determination module 400 may then sense the distance and provide it to device parameter generation module 402.

In addition, device parameter generation module 402 may receive device characteristics 404. Depending on the configuration of system 100, device characteristics 404 may be provided by device identification module 404A or display/video ability determination module 404B. In one embodiment, device identification module 404A may determine the manufacturer and/or a model identifier for system 100. For example, if system 100 is an Apple Iphone™ 4S, device identification module 404A may be able to determine that the manufacturer of system 100 is "Apple" and the model identifier as "iphone 4s". Device identification module 404A may then use the manufacturer/model to access device characteristic information stored locally in system 100, or in a remote database (e.g., accessible via the Internet), for generating device parameters. Characteristic information may include, for example, display type (e.g., 3-D display technology), display (e.g., screen dimensions, resolution), video circuitry type (e.g., video chipset), etc.

Alternatively, device/video ability determination module 404B may determine the above device characteristics directly from system 100. All-in-one systems like smartphones, tablet computers, laptops, etc. may store device characteristics for system 100 in the OS. For systems with external displays (e.g., computer monitors, televisions, etc.) device characteristics may be available via the system connection (e.g., Universal Serial Bus (USB), Digital Visual Interface (DVI), High-Definition Multimedia Interface (HDMI), etc.) through "Plug 'n Play" interaction. Regardless of whether generated by device identification module 404A or display/video ability determination module 404B, the device characteristics may be provided to device parameter determination module 402, which may then output device parameters based on the distance and device characteristics. For example, device parameter generation module 402 may consider the viewer distance from display 112, the dimensions/resolution of display 112, the 3-D technology employed in display 112, etc. when generating device parameters that will allow AV 102 to be displayed on system 100 with the same sense of 3-D immersion intended by the creator of AV 102, even though AV 102 may have been created for display on another type/size of display 112. The device parameters may then be provided to depth control 106.

Figure 5:
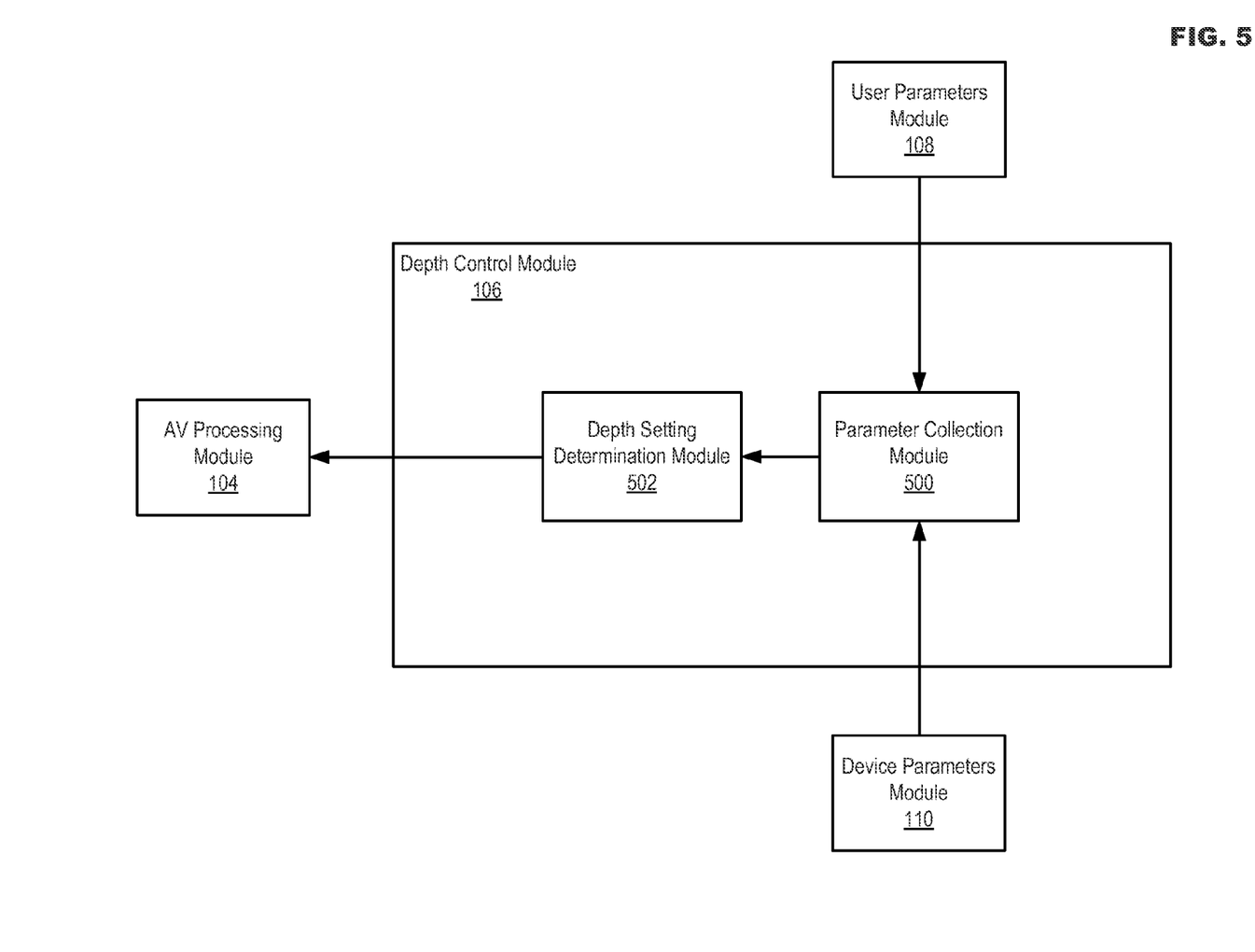
FIG. 5 illustrates an example depth control module in accordance with at least one embodiment of the present disclosure.

FIG. 5 illustrates example depth control module 106 in accordance with at least one embodiment of the present disclosure. Parameter collection module 500 may be configured to collect parameters from user parameters module 108 and device parameters module 110. In one embodiment, device parameters may only be collected if user parameters are not available (e.g., a user profile was determined not to exist for a user, system 100 does not support user parameter determination, etc.). The collected parameters may be provided to depth setting determination module 502. Depth setting module 502 may determine a depth setting (e.g., image disparity) based on the collected parameters. For example, the collected parameters may indicate a user specified range of allowed depth effect, and depth setting module 502 may adjust the depth setting so that the depth effect falls within this range but still stays as close to the intended 3-D immersion of the creator of AV 102 as possible. Alternatively, depth setting module 502 may receive collected parameters that describe the position of the viewer and/or the type, size and functionality of display 112 in system 100. Depth setting module 502 may then adjust the depth setting to recreate the depth effect that would have manifested in the intended venue (e.g., in a movie theatre) on display 112 based on the viewer position and the characteristics of display 112.

Figure 6:
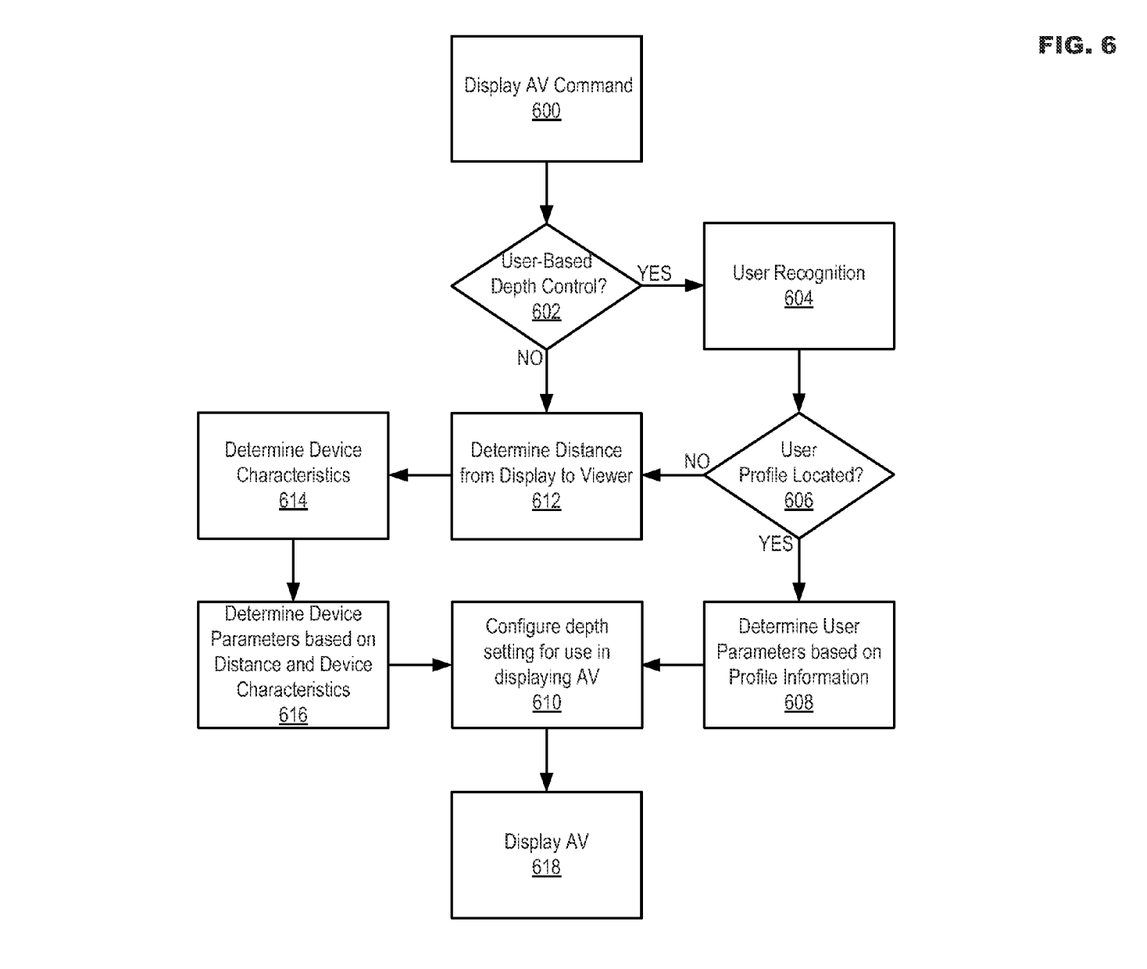
FIG. 6 is a flowchart of example operations for intelligent depth control in accordance with at least one embodiment of the present disclosure.

FIG. 6 is a flowchart of example operations for intelligent depth control in accordance with at least one embodiment of the present disclosure. In operation 600 a command to display AV may be received in a system configured to display AV. A determination may then be made in operation 602 as to whether user-based depth control is available. If in operation 602 it is determined that user-based depth control is available, the process may proceed to operation 604 wherein user recognition is initiated. In one embodiment, user recognition may include a facial recognition process wherein an image of a user is captured by an image capture device, a face is detected in the image and features are extracted from the face. The extracted features may then be compared to existing facial patterns in order to determine if a user profile exists for the user. A determination may then be made in operation 606 whether a user profile corresponding to the user exists. If in operation 606 a user profile corresponding to the user is determined to exist, then in operation 608 information contained in the user profile may be accessed (e.g., depth preferences configured by the user) in order to determine user parameters. A depth setting may then be configured for displaying the AV in operation 610 based on the user parameters.

If in operation 602 a determination is made that user-based depth control is not available in the system, or alternatively, if a determination is made that no user profile exists in operation 606, then in operation 612 a distance from a system display to a viewer that will be viewing the AV may be determined. The distance may be determined, for example, using a proximity sensor in the system. Device characteristics may then be determined in operation 614. For example, a manufacturer/model for the system may be determined, or alternatively, characteristics of the display in the system may be determined such as display type, display size, video chipset, etc. The distance determined in operation 612 and device characteristics determined in operation 614 may then be employed in operation 616 in determining device parameters. For example, the device parameters may be usable in operation 610 for configuring the depth setting so that the depth effect intended by the creator of the AV may be experienced by the viewer even though the AV may have been created for another system. Regardless of whether user parameters are provided in operation 608 or device parameters are provided in operation 616, the depth setting for use in displaying the AV may be configured in operation 610 and the AV may be displayed in operation 618.

While FIG. 6 illustrates various operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device. The storage medium may be non-transitory.

Thus, the present disclosure provides systems and methods for intelligent depth control. A system configured to display autostereoscopic video (AV) may determine a depth setting (e.g., image disparity setting) for displaying the AV based on at least one of user parameters or device parameters, and may proceed to display the AV on a display, the displaying being based on the depth setting. In one embodiment the system may try to obtain user parameters before relying on device parameters. User parameters may be available from user profiles. For example, facial recognition may be used to determine if a user profile exists for a user. If a user profile is determined not to exist, then the system may sense a distance from the display to the viewer, and may proceed to determine the depth setting based on the distance and device characteristics. Device characteristics may identify the manufacturer/model of the system, the type/size of display on which the AV will be viewed, the abilities of the system, etc.

According to one aspect there is provided a system. The system may include a depth control module configured to determine a depth setting for use in displaying autostereoscopic video (AV), the depth setting being based on at least one of user parameters or device parameters and an AV processing module configured to display the AV on a display, the displaying of the AV being based on the depth setting.

According to another aspect there is provided a system. The system may include at least one machine-readable storage medium having stored thereon, individually or in combination, instructions that when executed by one or more processors result in the following operations comprising determining a depth setting for use in displaying autostereoscopic video (AV) based on at least one of user parameters or device parameters and displaying the AV on a display, the displaying of the AV being based on the depth setting.

According to another aspect there is provided a method. The method may include determining a depth setting for use in displaying autostereoscopic video (AV) based on at least one of user parameters or device parameters and displaying the AV on a display, the displaying of the AV being based on the depth setting.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
a depth control module configured to determine a depth setting for use in displaying autostereoscopic video (AV), the depth setting being based on at least one of user parameters or device parameters; and
an AV processing module configured to display the AV on a display, the displaying of the AV being based on the depth setting;
an image capture module configured to capture an image; and
a user parameter module configured to detect a face within the captured image, determine features based on the detected face, and determine whether a user profile of a particular user corresponding to the features exists, the user profile comprising depth preference information, said depth preference information comprising a user specified amount of depth for displaying said AV:
wherein when said user profile exists, said user parameters are based on said depth preference information,
wherein the depth setting is based on device parameters only if a user profile corresponding to the features of a particular user is determined not to exist.

2. The system of claim 1, further comprising:
a proximity sensing module configured to determine a distance from the display to a viewer of the AV; and
a device parameters module configured to determine the device parameters based on the distance and device characteristics.

3. The system of claim 2, wherein the device characteristics include information identifying at least one of a manufacturer of the system or a model identifier for the system.

4. The system of claim 2, wherein the device characteristics include information identifying at least one of a display type, a display size, or a video chipset.

5. The system of claim 1, wherein the depth setting is an amount of image disparity for displaying left and right images in the AV.

6. A system, comprising at least one non-transitory machine-readable storage medium having stored thereon, individually or in combination, instructions that when executed by one or more processors result in the following operations comprising:

determining a depth setting for use in displaying autostereoscopic video (AV) based on at least one of user parameters or device parameters;

displaying the AV on a display, the displaying of the AV being based on the depth setting;

capturing an image;

detecting a face within the captured image; determining features from the detected face;

determining whether a user profile of a particular user corresponding to the features exists, the user profile comprising depth preference information, said depth preference information comprising a user specified amount of depth for displaying said AV:

wherein when said user profile exists, said user parameters are based on said depth preference information, wherein the depth setting is based on device parameters if a user profile corresponding to the features of a particular user is determined not to exist.

7. The system of claim 6, wherein the instructions that when executed by one or more processors result in the following additional operations:

sensing a distance from the display to a viewer of the AV; and determining the device parameters based on the distance and device characteristics.

8. The system of claim 7, wherein the device characteristics include information identifying at least one of a manufacturer of the system or a model identifier for the system.

9. The system of claim 7, wherein the device characteristics include information identifying at least one of a display type, a display size, or a video chipset.

10. The system of claim 6, wherein the depth setting is an amount of image disparity for displaying left and right images in the AV.

11. A method, comprising:

determining a depth setting for use in displaying autostereoscopic video (AV) based on at least one of user parameters or device parameters;

displaying the AV on a display, the displaying of the AV being based on the depth setting; capturing an image;

detecting a face within the captured image; determining features from the detected face; and determining whether a user profile of a particular user corresponding to the features exists, the user profile comprising depth preference information, said depth preference information comprising a user specified amount of depth for displaying said AV:

wherein when said user profile exists, said user parameters are based on said depth preference information;

wherein the depth setting is based on device parameters only if a user profile corresponding to the features of a particular user does not exist.

12. The method of claim 11, further comprising:

sensing a distance from the display a user that will view the AV information; and determining the device parameters based on the distance and device characteristics.

13. The method of claim 12, wherein the device characteristics include information identifying at least one of a manufacturer of the system or a model identifier for the system.

14. The method of claim 12, wherein the device characteristics include information identifying at least one of a display type, a display size, or a video chipset.

15. The method of claim 11, wherein the depth setting is an amount of image disparity for displaying left and right images in the AV.

* * * * *